US009079520B1

(12) United States Patent
Hungerford (10) Patent No.: US 9,079,520 B1
(45) Date of Patent: Jul. 14, 2015

(54) SIDE HEADREST WITH CHIN SUPPORT AND CLAMP

(71) Applicant: John Hungerford, Vero Beach, FL (US)

(72) Inventor: John Hungerford, Vero Beach, FL (US)

( * ) Notice: Subject to any disclaimer, the term of this patent is extended or adjusted under 35 U.S.C. 154(b) by 0 days.

(21) Appl. No.: 14/154,290

(22) Filed: Jan. 14, 2014

(51) Int. Cl.
*B60N 2/48* (2006.01)

(52) U.S. Cl.
CPC ............ *B60N 2/4879* (2013.01); *B60N 2/4805* (2013.01)

(58) Field of Classification Search
CPC ..... B60N 2/4805; B60N 2/4879; A47C 7/383
USPC .......................... 297/392, 397, 399, 400, 402
See application file for complete search history.

(56) References Cited

U.S. PATENT DOCUMENTS

| 42,084 | A | | 3/1864 | Hambujer | |
|---|---|---|---|---|---|
| 104,473 | A | | 6/1870 | Lyon | |
| 162,784 | A | | 5/1875 | White | |
| 221,752 | A | | 11/1879 | Taylor | |
| 344,726 | A | * | 6/1886 | Dolton | 297/403 |
| 361,528 | A | * | 4/1887 | Kazanjian | 297/402 |
| 379,987 | A | | 3/1888 | Ryan | |
| 426,069 | A | | 4/1890 | Rogers | |
| 571,209 | A | * | 11/1896 | Adams | 297/392 |
| 2,387,079 | A | * | 10/1945 | Lansden | 297/392 |
| 2,555,814 | A | | 6/1951 | Pulsifer | |
| 2,638,152 | A | * | 5/1953 | Pulsifer | 297/400 |
| 5,108,150 | A | * | 4/1992 | Stas et al. | 297/397 |
| 5,528,784 | A | | 6/1996 | Painter | |
| 5,800,019 | A | * | 9/1998 | Knightlinger | 297/399 |
| D444,980 | S | | 7/2001 | Mowat | |
| 7,204,557 | B1 | * | 4/2007 | Burton | 297/397 |
| 7,393,057 | B2 | | 7/2008 | Fraser | |
| 8,033,603 | B2 | | 10/2011 | Meert | |
| 2006/0250015 | A1 | | 11/2006 | Buck | |
| 2012/0007405 | A1 | * | 1/2012 | Kim | 297/397 |

OTHER PUBLICATIONS

Hungerford, J., PCT Serial No. PCT/US14/58990 filed Oct. 3, 2014, Notification of Transmittal of the International Search Report and the Written Opinion of the International Searching Authority, or the Declaration mailed on Feb. 2, 2015, 21 pages.

* cited by examiner

*Primary Examiner* — Peter Brown
(74) *Attorney, Agent, or Firm* — Brian S. Steinberger; Law Offices of Brian S. Steinberger, P.A.

(57) ABSTRACT

Apparatus, devices, systems, and methods for clamping a portable headrest with chin support on top a back of a seat, which is both adjustable and foldable to be portable for ease in transport. The horizontal chin rest pivotally attached to the bottom of a vertical member allows a sitting person's head to be supported in an upright position, while restricting movement both forward and side to side.

7 Claims, 14 Drawing Sheets

SIDE HEADREST WITH CHIN SUPPORT AND CLAMP

FIELD OF INVENTION

This invention relates to attachable and detachable head supports, and in particular to apparatus, devices, systems, and methods for clamping a portable headrest with chin support on top a back of a seat, that is both adjustable and foldable for portability.

BACKGROUND AND PRIOR ART

Passengers and travelers that travel over long distances with or without stop-over's typically have difficulty relaxing and falling asleep while sitting in upright positions. Most seats on aircraft, busses, trains and the like, have limited capability of allowing the seat to be fully reclined to a horizontal position. Most seats cannot fully recline since a reclined seat would hit against a passenger sitting behind. As such, the passenger/traveler has to try to relax and sleep in a generally upright position.

A problem with sitting upright is that the head of the seated passenger/traveler will tend to fall sideways and foreword over time. Using one's hand to support one's head is difficult since there is nothing for the bent elbow to rest on, and is also uncomfortable.

Seat belt harnesses and cross-chest straps may keep the passenger/traveler in a vertical position, but do not prevent their head from bending side to side or bending forward.

A popular type of travel aid is the ergonomic pillow generally formed from foam with a side cut-out so that the pillow can wrap about one's neck. See for example, U.S. Des. D444,980 to Mowat et al. However, these types of pillows are best used by persons in generally horizontal sleeping positions, which do not have the problem of the passenger/traveler being in an upright sitting position where they can tend to fall forward. Additionally, these types of foam pillows can be quite bulky and are not easily collapsible.

Attempts have been made of the years to attach headrests on seats. See for example, U.S. Pat. No. 42,084 to Hambujer; U.S. Pat. No. 104,473 to Lyon et al.; U.S. Pat. No. 162,784 to White; U.S. Pat. No. 221,752 to Taylor; U.S. Pat. No. 379,987 to Ryan; U.S. Pat. No. 426,069 to Rogers; U.S. Pat. No. 255,814 to Pulsifer; and U.S. Pat. No. 7,393,057 to Fraser.

However, these headrest supports are generally limited to single pads, curved bars, which rest against the side or back of the head, and do not prevent the passenger/traveler from falling forward. Additionally, these devices are generally bulky, and do not fold up when not being used.

Thus, the need exists for solutions to the above problems with the prior art.

SUMMARY OF THE INVENTION

A primary objective of the present invention is to provide apparatus, devices, systems, and methods for clamping a portable headrest with chin support on top a seat backing, with a clamp portion being adjustable for different size seat backs.

A secondary objective of the present invention is to provide apparatus, devices, systems, and methods for clamping a portable headrest with chin support on top a seat backing, having an adjustable chin support for supporting one's head at different heights depending on the size of the seated passenger.

A third objective of the present invention is to provide apparatus, devices, systems, and methods for clamping a portable headrest with chin support on top a seat backing, having a height adjustable chin support for supporting a seated passenger's head at different heights depending on the size of the seated passenger.

A fourth objective of the present invention is to provide apparatus, devices, systems, and methods for clamping a portable headrest with chin support on top a seat backing, having a padded chin support for comfortably supporting the chin of the seated passenger.

A fifth objective of the present invention is to provide apparatus, devices, systems, and methods for clamping a portable headrest with chin support on top a seat backing, that is foldable for ease in transport, when not being used.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.
10 Portable seat back headrest.
20 Hook base.
30 Hook slide.
40 Hook release button.
50 Hook lock screw/bolt with enlarged head.
60 Lock screw slot in base.
70 Lock detents in base.
80 Release spring.
90 Top tube.
100 Holes in top tube for length adjustment.
110 Spring pin in bottom tube for length adjustment.
120 Bottom tube.
130 Rotating chin rest hinge allows chin rest to rotate about bottom tube.
140 Chin rest hinge pin.
150 Bottom tube cap.
160 Chin rest.
170 Chin rest foam cushion tube fits over chin rest.
180 Seat back.
190 Chin rest user.

Figure 1:
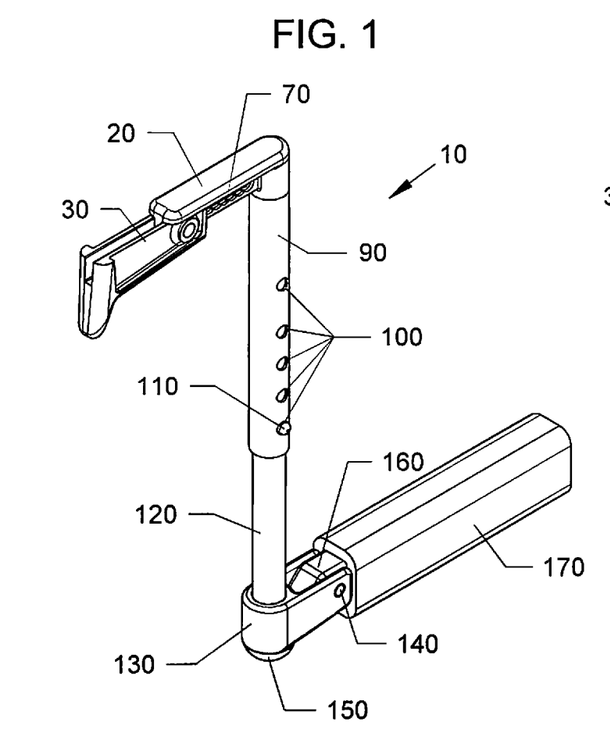
FIG. 1 is a rear top perspective view of the novel headrest in a deployed position.
Figure 2:
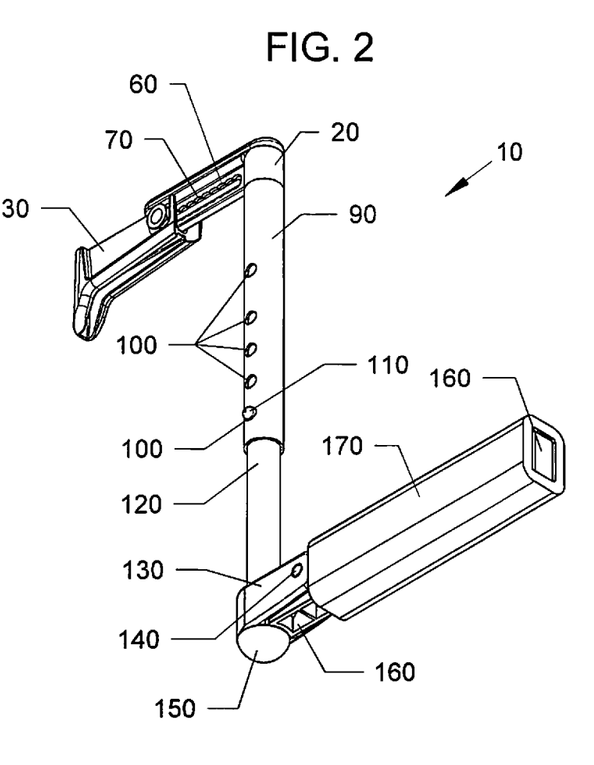
FIG. 2 is a front bottom perspective view of the headrest of FIG. 1.
Figure 3:
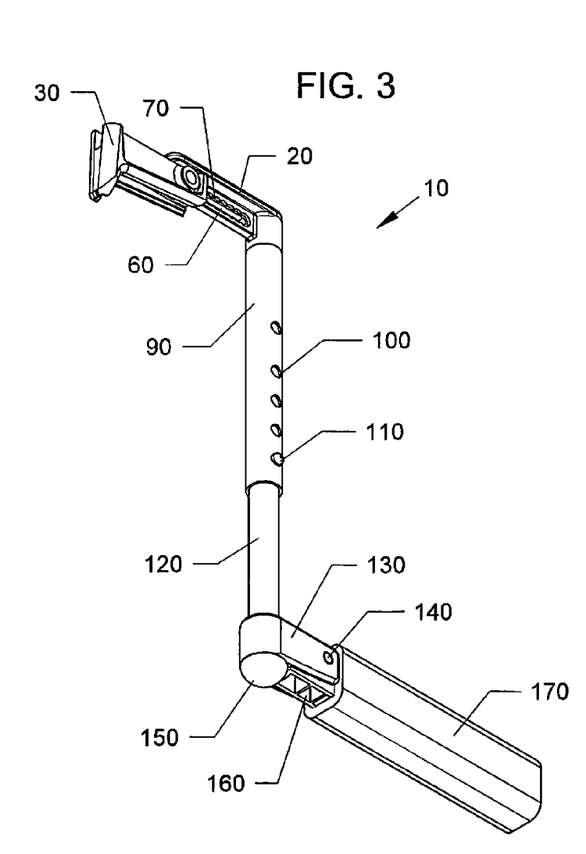
FIG. 3 is a rear bottom perspective view of the headrest of FIG. 1.

FIG. 1 is a rear top perspective view of the novel headrest 10 in a deployed position. FIG. 2 is a front bottom perspective view of the headrest 10 of FIG. 1. FIG. 3 is a rear bottom perspective view of the headrest 10 of FIG. 1.

Figure 4:
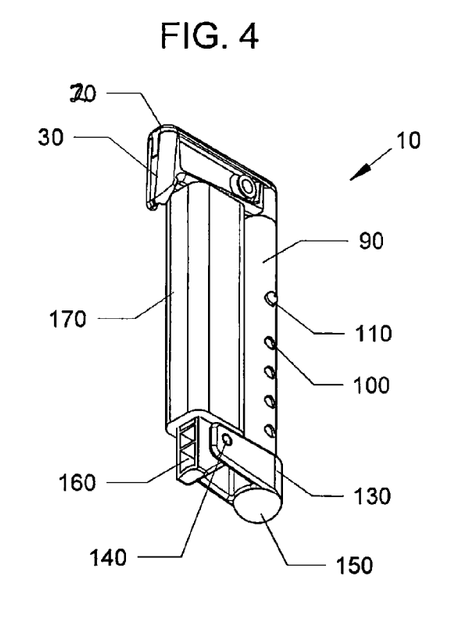
FIG. 4 is another view of the headrest of FIG. 3 folded for storage.

FIG. 4 is another view of the headrest of FIG. 3 folded for storage.

Figure 5:
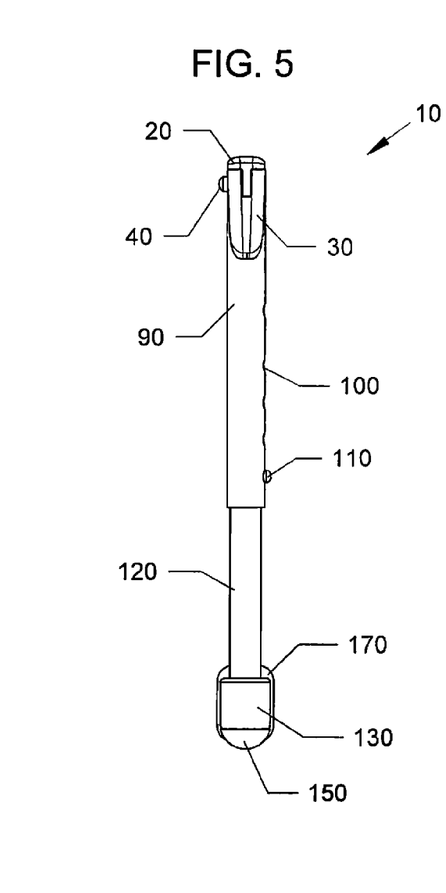
FIG. 5 is a rear view of the headrest of FIG. 1.
Figure 6:
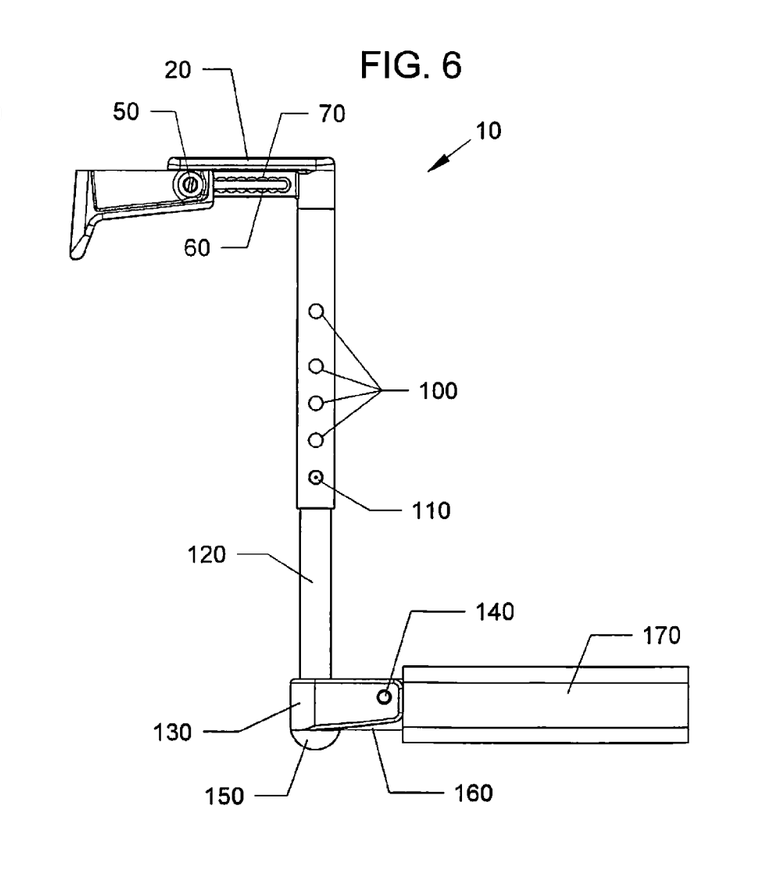
FIG. 6 is a left side view of the headrest of FIG. 1.
Figure 7:
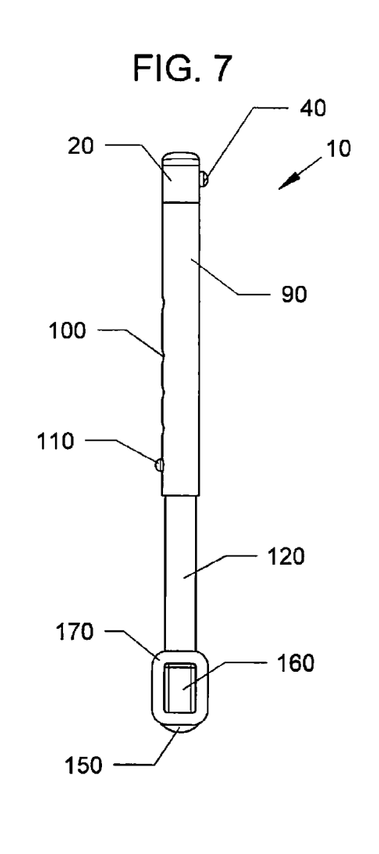
FIG. 7 is a front view of the headrest of FIG. 1.
Figure 8:
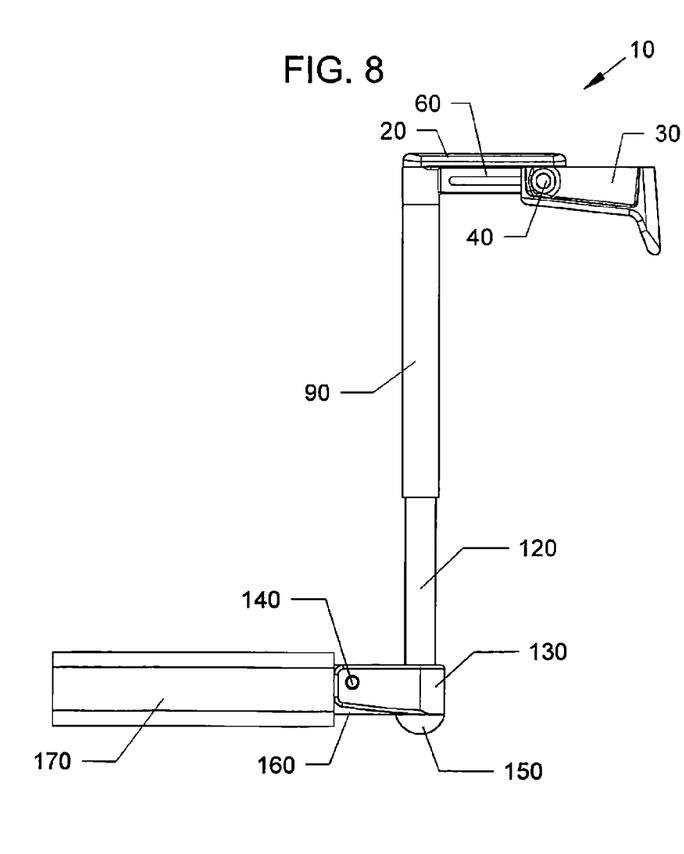
FIG. 8 is a right side view of the headrest of FIG. 1.
Figure 9:
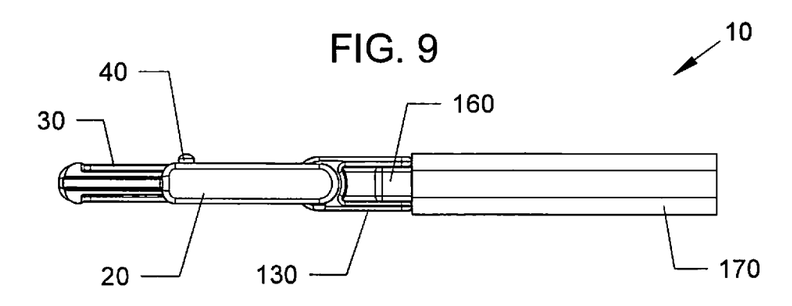
FIG. 9 is a top view of the headrest of FIG. 1.
Figure 10:
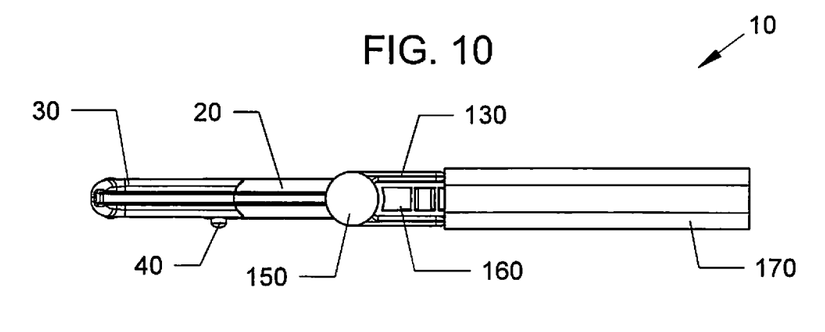
FIG. 10 is a bottom view of the headrest of FIG. 1.

FIG. 5 is a rear view of the headrest 10 of FIG. 1. FIG. 6 is a left side view of the headrest 10 of FIG. 1. FIG. 7 is a front view of the headrest 10 of FIG. 1. FIG. 8 is a right side view of the headrest 10 of FIG. 1. FIG. 9 is a top view of the headrest 10 of FIG. 1. FIG. 10 is a bottom view of the headrest 10 of FIG. 1.

Referring to FIGS. 1-3 and 5-10, the novel head rest 10 includes a hook base 20 attached to the upper end of a top tube 90. A hook slide 30 with hook release button 40 can slide relative to a lock screw slot 60 in base 20 having lock detents 70 in the base 20. The top tube 90 can telescopingly slide about a bottom tube 120. An outwardly extending spring biased pin 110 in bottom tube 120 can pop in and out of through holes 100 in the top tube 90 that allow for different height adjustment of the top tube 90 relative to bottom tube 120.

A rotating chin rest hinge 130 held in place by bottom tube cap 150 allows for horizontally attached chin rest 160 to pivot horizontally relative to the lower end of the bottom tube 120. A chin rest hinge pin 140 attached to the rest hinge 130 and the horizontal chin rest 160, allows for the chin rest 160 to pivot up relative to the pivot pin 140. A cushion sleeve 170 such as a foam sleeve can wrap about the chin rest 160.

Figure 11:
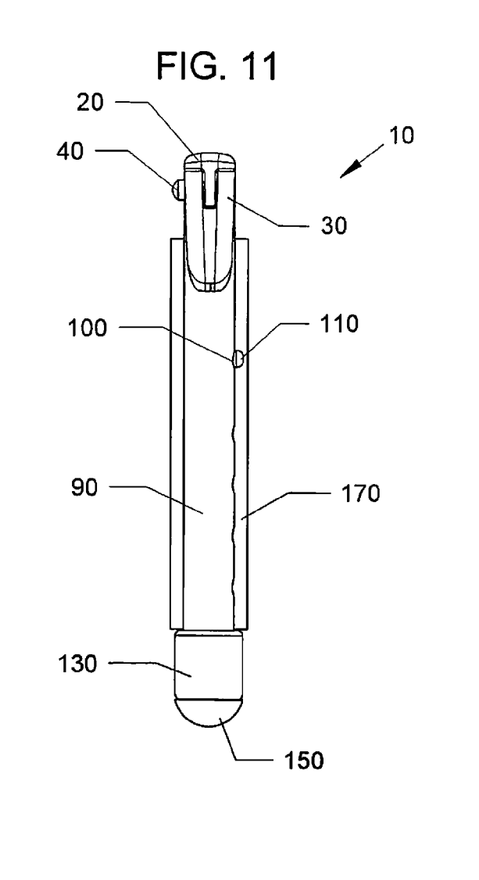
FIG. 11 is a rear view of the folded headrest of FIG. 4.
Figure 12:
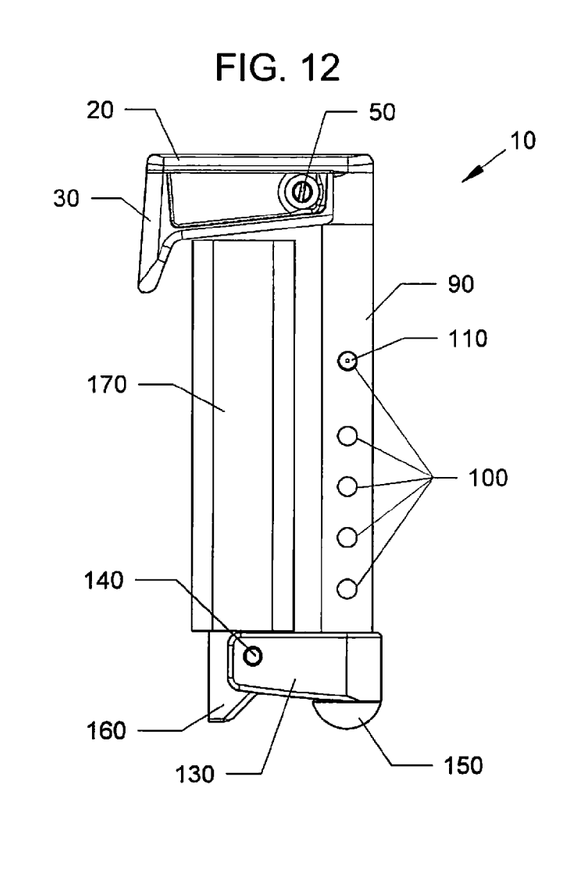
FIG. 12 is a left side view of the folded headrest of FIG. 4.
Figure 13:
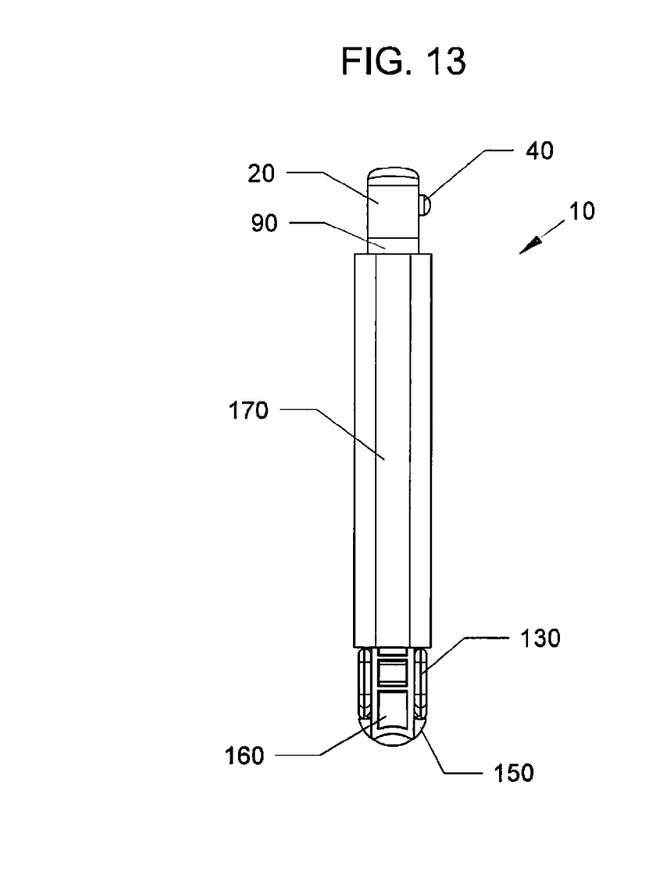
FIG. 13 is a front view of the folded headrest of FIG. 4.
Figure 14:
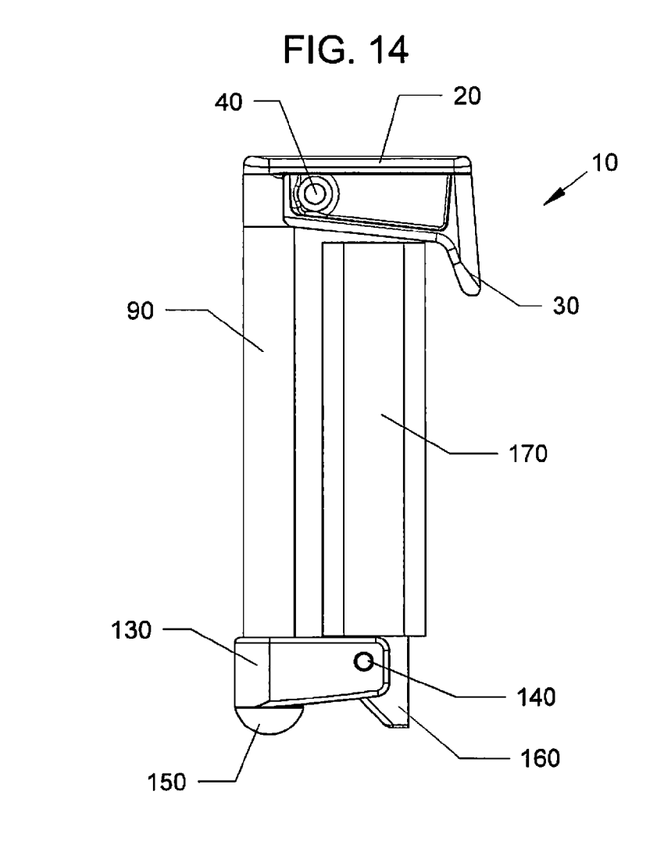
FIG. 14 is a right side view of the folded headrest of FIG. 4.
Figure 15:
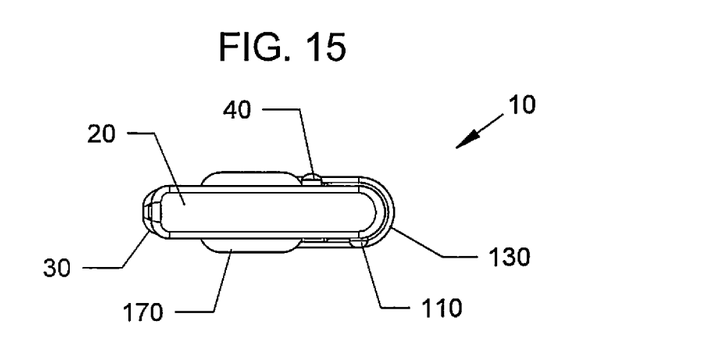
FIG. 15 is a top view of the folded headrest of FIG. 4.
Figure 16:
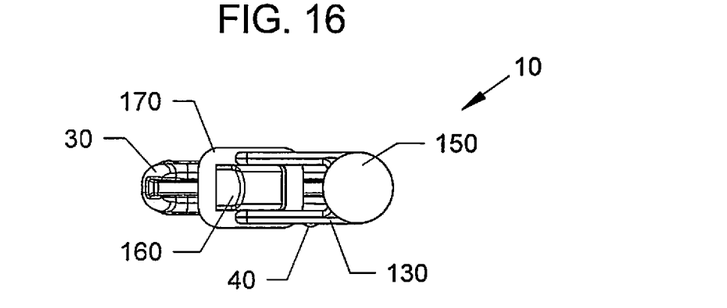
FIG. 16 is a bottom view of the folded headrest of FIG. 4.

FIG. 11 is a rear view of the folded headrest 10 of FIG. 4.
FIG. 12 is a left side view of the folded headrest 10 of FIG. 4.
FIG. 13 is a front view of the folded headrest 10 of FIG. 4.
FIG. 14 is a right side view of the folded headrest 10 of FIG. 4. FIG. 15 is a top view of the folded headrest 10 of FIG. 4.
FIG. 16 is a bottom view of the folded headrest 10 of FIG. 4.

Referring to FIGS. 4 and 11-16, the novel headrest 10 can collapsed into a folded position with the hook slide 30 slid inwardly along lock screw slot 60 of the hook base. The top tube 90 can be slid down over bottom tube 120 to be substantially concentric and overlying with one another. The chin rest 160 can be pivoted about chin rest hinge pin 140, and folded upward by hinge pin 140, so that the chin rest 160 is parallel to overlying tubes 90, 120, and hook base 20 is parallel to rest hinge 130.

The folded headrest 10 can be sized in order to fit in a user's pocket, a backpack, a briefcase, handbag, and the like. Additionally, the headrest can be made from lightweight materials, and the like.

Figure 17:
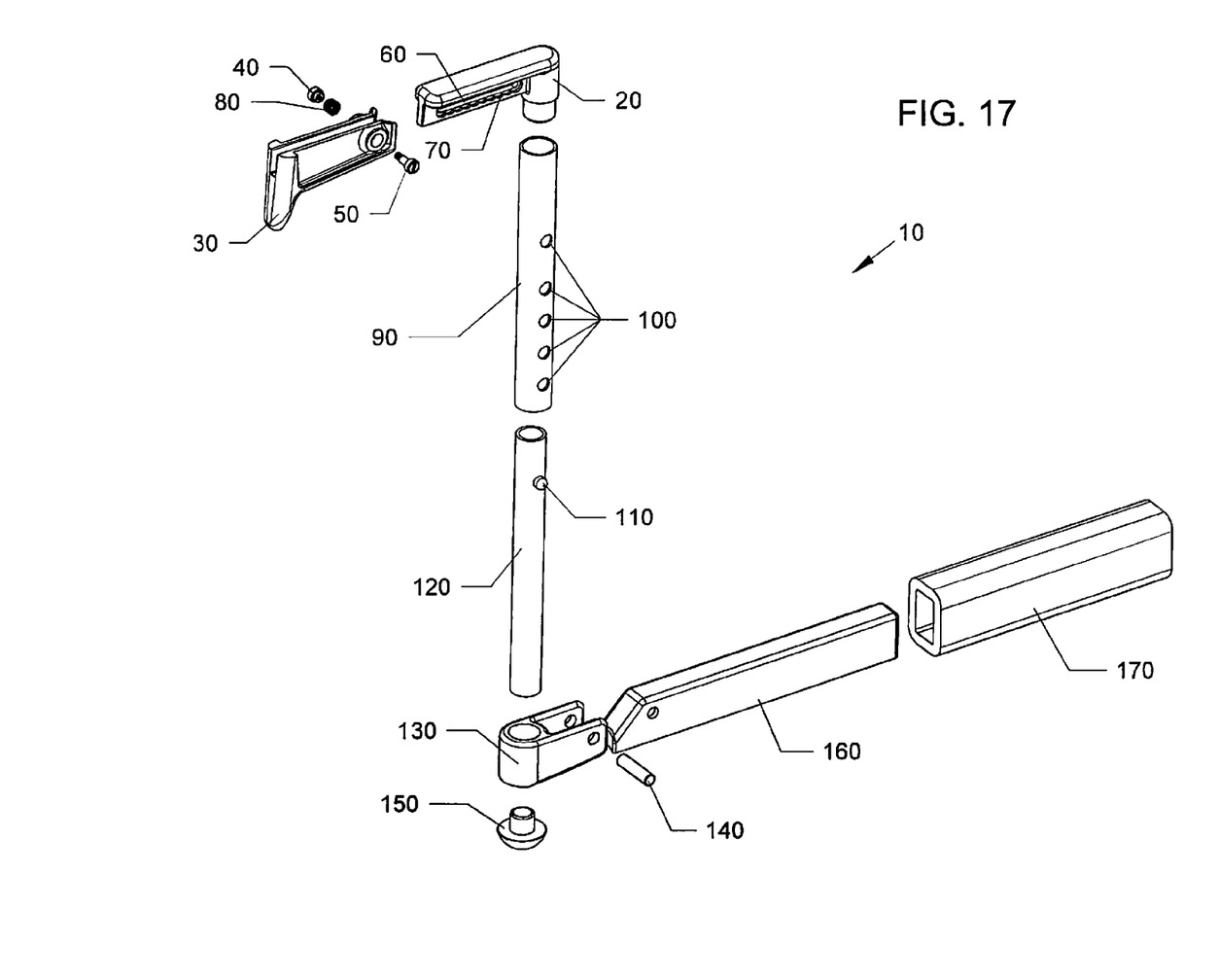
FIG. 17 is an exploded perspective view of the headrest of the preceding figures.

FIG. 17 is an exploded perspective view of the headrest 10 of the preceding figures. The detail of the hook lock screw 50 with release spring 80 which can overlay the threaded end of the screw 50 and a hook release button 40.

Figure 18:
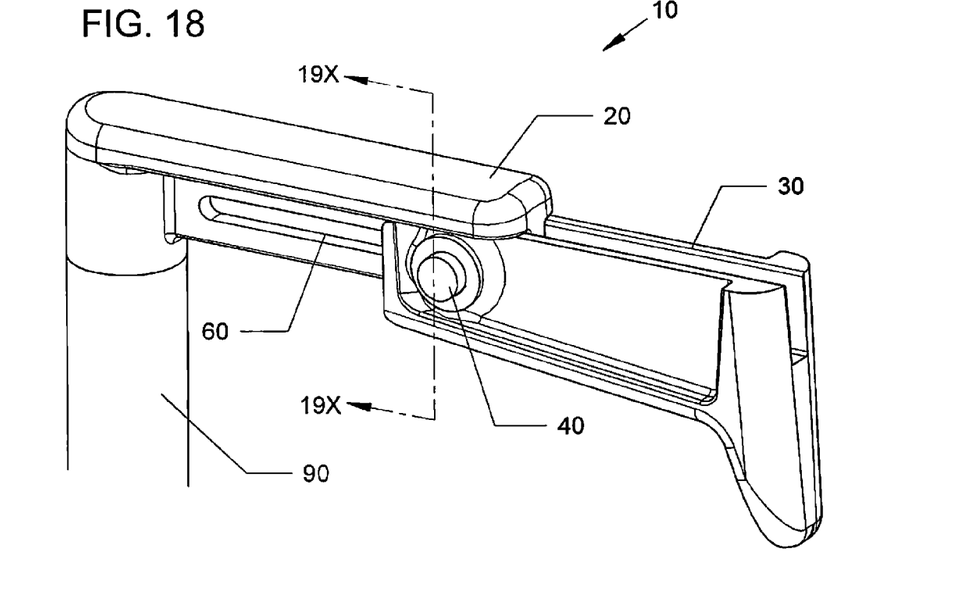
FIG. 18 is an enlarged view of the hook base and hook slide of the headrest of the preceding figures.

FIG. 18 is an enlarged view of the hook base 20 and hook slide 30 of the headrest 10 of the preceding figures.

Figure 19A:
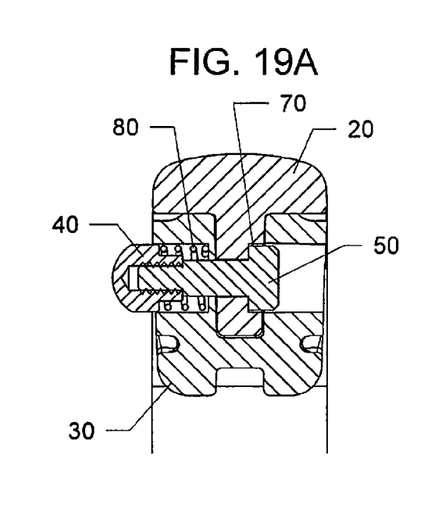
FIG. 19A is a cross-sectional view of the hook base and slide of the headrest of FIG. 18 along arrows 19X showing the release button and lock screw/bolt with the lock screw/bolt nested under spring pressure by spring into one of several detents in the base (a locked clamp position).

FIG. 19A is a cross-sectional view of the hook base 20 and slide 30 of the headrest 10 of FIG. 18 along arrows 19X showing the release button 40 and lock screw/bolt 50 with the lock screw/bolt 50 nested under spring pressure by spring 80 into one of several detents 70 in the base 20. In this view, the hook slide 30 (clamp) is locked in a fixed horizontal position.

Figure 19B:
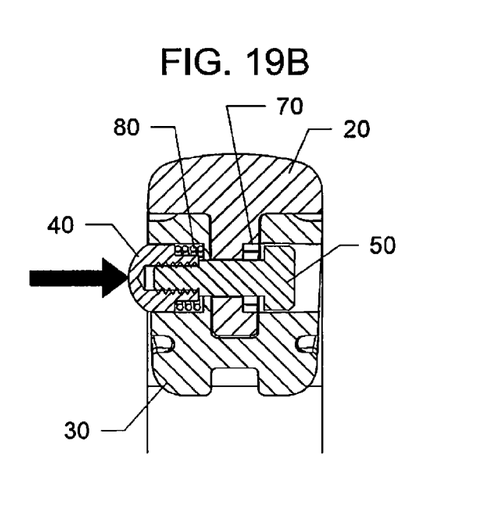
FIG. 19B is another cross-sectional view of the hook base and hook slide of FIG. 18 along arrows 19X with the release button being pressed and the lock screw/bolt released from the detent in the base (an unlocked clamp position).

FIG. 19B is another cross-sectional view of the hook base 20 and hook slide 30 of FIG. 18 along arrows 19X with the release button 40 being pressed and the lock screw/bolt 50 released from the detent 70 in the base 20. In this view, the hook slide 30 (clamp) is unlocked and is adjustable for different thickness widths of the back of the seat.

Figure 20:
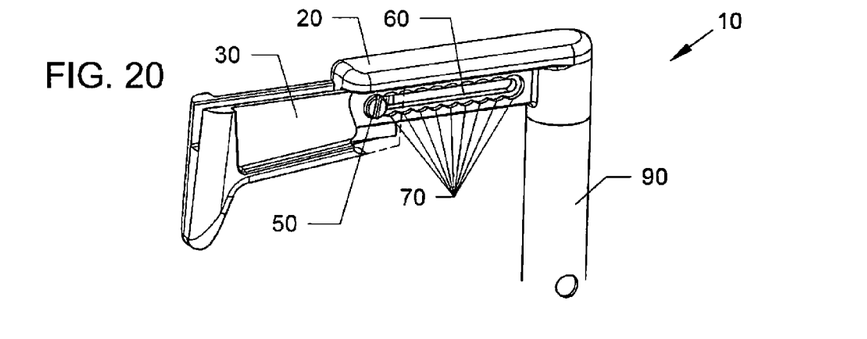
FIG. 20 is a partial cut-away detail of the clamp base of the headrest showing the head of the lock screw/bolt nested in the first base detent.

FIG. 20 is a partial cut-away detail of the clamp base 20 of the headrest showing the head of the lock screw/bolt 50 nested in the first base detent 70.

Figure 21:
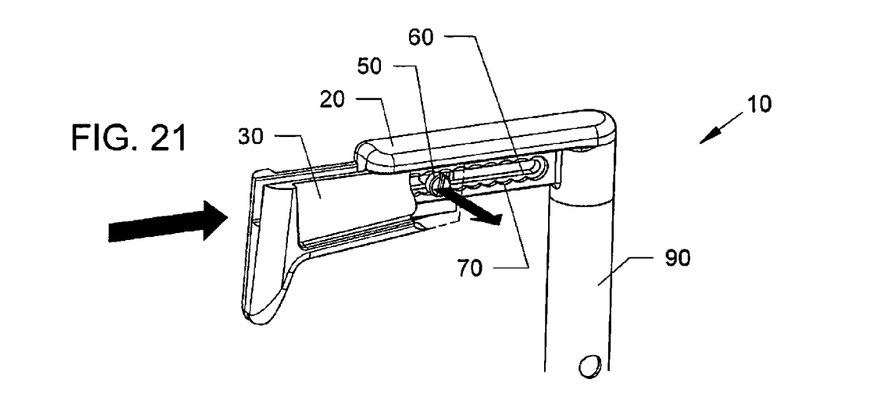
FIG. 21 is another view of FIG. 20 showing the head of the lock screw/bolt pushed out of the detent (the release button 40 on the opposite of the view is being pressed).

FIG. 21 is another view of FIG. 20 showing the head of the lock screw/bolt 50 pushed out of the detent 70 (the release button 40 on the opposite of the view is being pressed). The hook slide 30 can then be adjusted slide relative to the hook base 20.

Figure 22:
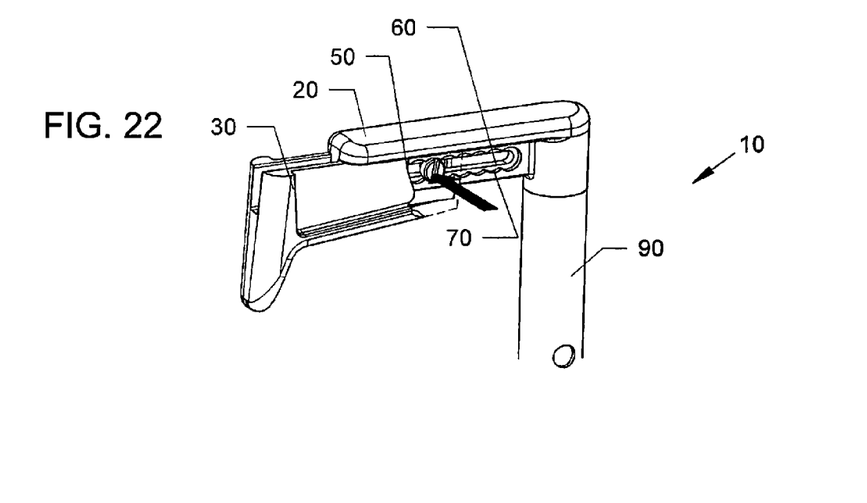
FIG. 22 is another view of FIG. 21 showing the hook slide adjusted and lock screw/bolt head nested in another detent.

FIG. 22 is another view of FIG. 21 showing the hook slide 30 adjusted and the lock screw/bolt 50 head nested in an alternate detent 70.

Figure 23:
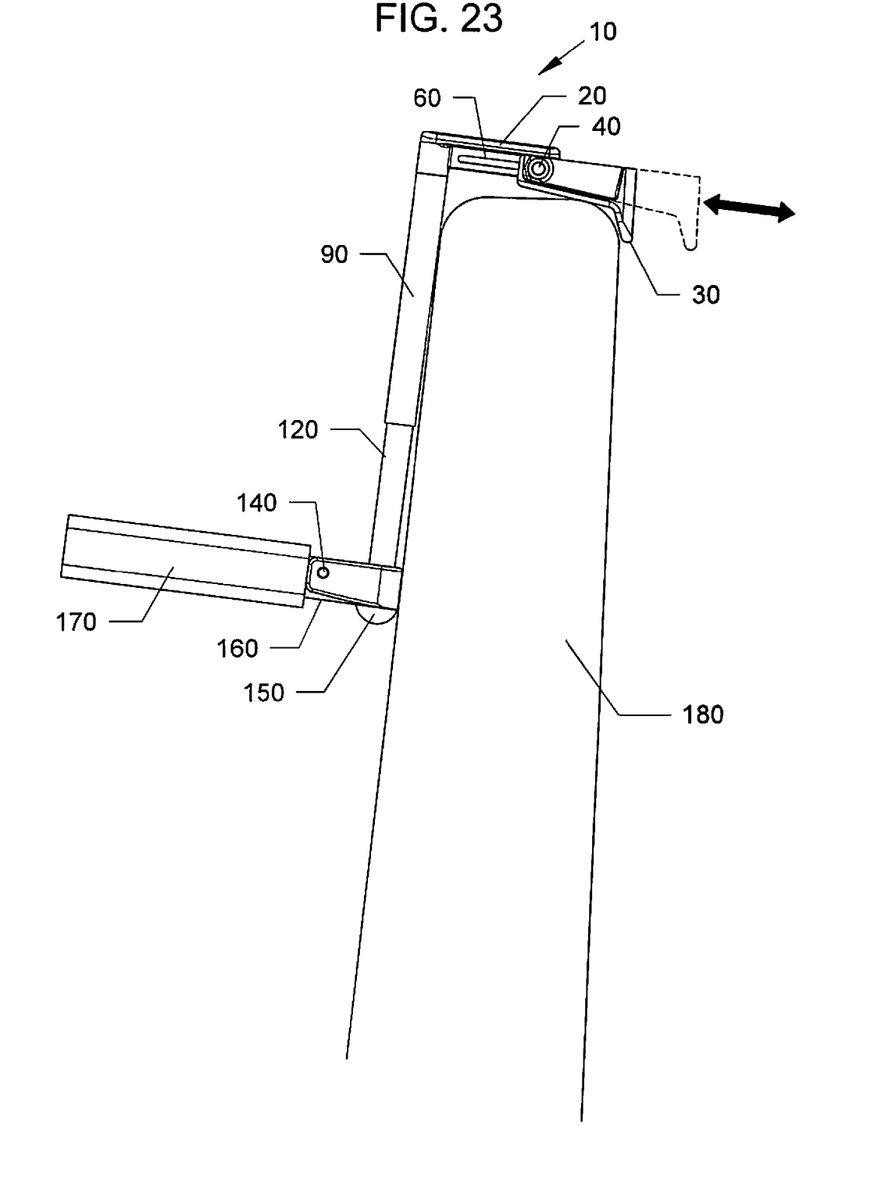
FIG. 23 is a side view of the headrest of the preceding figures clamped to a seat back.

FIG. 23 is a side view of the headrest 10 of the preceding figures with the hook slide 30 having an outer hook end clamped to a rear surface edges of the seat back 160, with the top tube 90 on the front side of seat back 160

Figure 24:
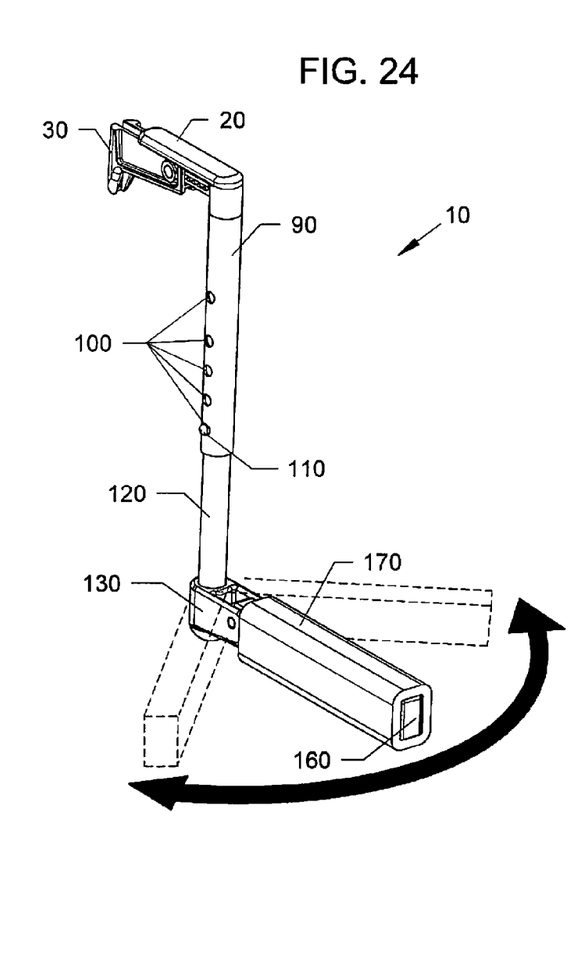
FIG. 24 is a perspective view of the headrest of the preceding figures showing chin rest being rotatable about the bottom tube for best location.

FIG. 24 is a perspective view of the headrest 10 of the preceding figures showing chin rest 160 with cushion sleeve 170 being rotatable in a horizontal direction about the bottom vertical tube 190 for best location.

Figure 25:
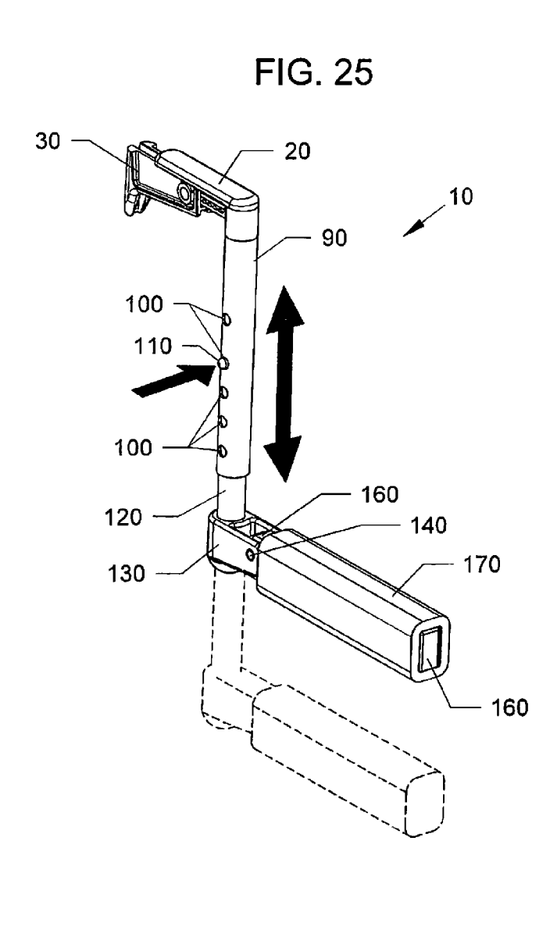
FIG. 25 is a perspective view of the headrest of FIG. 24 showing that the top and bottom tubes telescoping with one another and locked to a different overall length with the spring pin.

FIG. 25 is a perspective view of the headrest 10 of FIG. 24 showing that the top tube 90 and bottom tube 120 telescoping with one another and locked to a different overall length by the outwardly spring biased pin 110.

Figure 26:
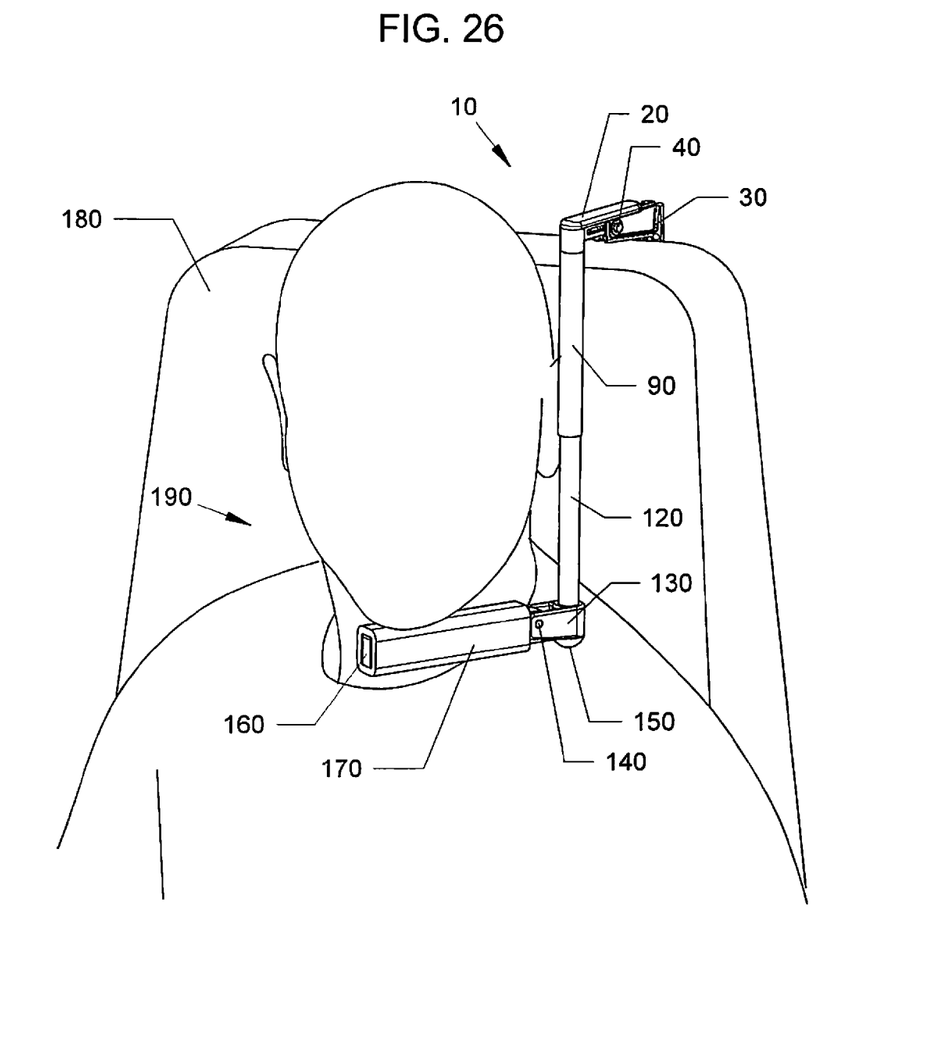
FIG. 26 is a perspective view of the headrest of the preceding figures showing a person resting their chin on an installed and adjusted headrest.

FIG. 26 is a perspective view of the headrest 10 of the preceding figures showing a person 190 resting their chin on the chin rest 160 with cushioned sleeve 170 of the installed and adjusted headrest 10.

The novel headrest 10 can be made from components, such as but not limited to metal, such as aluminum, galvanized metal, and the like, or plastic, or combinations thereof.

Another alternative version of the headrest is to have the clamp member, vertical member, and chin rest, to be formed from a pliable material. For example, another headrest can have a possible Z shape formed from a one piece of pliable material, such as aluminum, with a cushion overlayer. The pliable under support can be bent into shape, so that the clamp portion can bend about the top of a backrest, and the chin rest bent into a desired configuration. The pliable material can have a memory when manipulated into a selected shape. Additionally, parts of the headrest can have pliable parts, such as the chin rest, and/or the vertical member and/or the clamp member.

Although the preferred embodiment shows the chin rest portion having a cushion thereon, the novel headrest can also have a cushion about the vertical member. Additionally, the clamp member(s) can also have a cushion.

The invention can have additional shapes as needed. For example, the vertical member can have a pad or blinder shape, having a cushion surface with sufficient space for resting a user's face against. The pad and/or blinder can also be bendable. For example, there can be an underlying material, such as but not limited to aluminum, with a cushion face, with the underlying material having a memory when bent into a selected configuration.

The novel headrest 10 can be configured so that the vertical member is on the left side of the user's face or on the right side of their face. Additionally, two headrests 10 can be used so that the vertical members are on both the left side and right side of the user's face. Still another version can be headrest having both a left vertical member and a right vertical member.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An adjustable headrest comprising:

a clamp for attaching the headrest to a top of a back of a seat, the clamp having a base with a first end and a second end, and a slide with a first end and a second end, the second end of the slide having a hook, the first end of the slide for sliding relative to the second end of the base;

a vertical member having an upper end attached to the first end of the base of the clamp and a lower end, the vertical member being telescopingly adjustable to different lengths; and an elongated chin support having a first end and a second end with a generally uniform diameter therebetween, the first end of the chin support having a first pivot point attached to the lower end of the vertical member for allowing the chin support to pivot horizontally side to side relative to the vertical member, the first end of the chin support having a second pivot point adjacent to the lower end of the vertical member for allowing the chin support to pivot up and down relative to the lower end of the vertical member so that the elongated chin support is foldable into a parallel arrangement side by side with the vertical member with the clamp being generally perpendicular to the parallel folded chin support and the vertical member, and the hook on the clamp fits about an outer edge of the parallel folded chin support and the vertical member, and the elongated chin support is adaptable to be positioned under the chin of a person seated in the seat when the clamp is clamped about the top of the back of the seat.

2. The adjustable headrest of claim 1, wherein the chin support includes:

a cushion on a top of the chin support.

3. The adjustable headrest of claim 2, wherein the cushion includes: a sleeve for wrapping about the chin support.

4. A method of supporting a chin of a seated person by a headrest on a back of a seat, comprising the steps of:

providing a clamp having an outer hook end which slides relative to a base end so as to be adjustable to different lengths therebetween;

providing an elongated vertical member having a top end and a bottom end, the vertical member being telescopingly adjustable to different lengths therebetween;

attaching the top end of the vertical member to the base end of the clamp;

providing an elongated chin support having a first end and a second end with a generally uniform diameter therebetween;

attaching the bottom end of the vertical member to the first end of the chin support by a first pivot point for allowing the chin support to pivot horizontally side to side relative to the vertical member;

attaching the first end of the chin support adjacent to the bottom end of the vertical member by a second pivot point for allowing the chin support to pivot up and down relative to the bottom end of the vertical member;

folding the elongated chin support by the second pivot point into a parallel arrangement side by side with the vertical member with the clamp being generally perpendicular to the parallel folded chin support and vertical member, and the outer hook end of the clamp fits about an outer edge of the parallel folded chin support and the vertical member, adjusting the length between the hook end and base end of the clamp for clamping the clamp on the top of a back of a seat; and telescopingly adjusting the vertical member to a selected length between the clamp and the chin support; and unfolding the elongated chin support along the second pivot point to a generally horizontal orientation to the vertical member; and positioning the chin support with the first pivot point to be positioned underneath the chin of a person seating in the seat.

5. The method of claim 4, further comprising the step of: providing a cushion on a top of the chin support.

6. The method of claim 4, further comprising the step of: providing a sleeve for wrapping about the chin support.

7. An adjustable headrest comprising:

a clamp having a base end with a slidable hook end being adjustable to different lengths therebetween, the clamp adaptable to clamping to a top of a back of a seat;

a vertical member having an upper end attached to the base end of the clamp, and a lower end which telescopes to different lengths relative to the upper end; and an elongated chin support having a first end and a second end with a generally uniform diameter therebetween, the first end of the chin support having a first pivot point attached adjacent to the lower end of the vertical member for allowing the chin support to pivot horizontally side to side relative to the vertical member, the first end of the chin support having a second pivot point adjacent to the lower end of the vertical member for allowing the chin support to pivot up and down relative to the lower end of the vertical member so that the elongated chin support is foldable into a parallel arrangement with the vertical member while the clamp is generally perpendicular to the parallel folded chin support and vertical member, and the hook end on the clamp fits about an outer edge of the parallel folded chin support and the vertical member, and the elongated chin support is adaptable to be positioned under the chin of a person seated in the seat when the clamp is clamped about the top of the back of the seat.

\* \* \* \* \*